United States Patent Office.

JOHN M. ORDWAY, OF BOSTON, ASSIGNOR OF ONE-HALF TO EDWARD EMERSON WATERS, OF SANDWICH, MASSACHUSETTS.

OBTAINING A SUBSTITUTE FOR ALBUMEN FROM FISH-ROE.

SPECIFICATION forming part of Letters Patent No. 319,503, dated June 9, 1885.

Application filed June 6, 1884. (No specimens.)

*To all whom it may concern:*

Be it known that I, JOHN M. ORDWAY, of Boston, in the State of Massachusetts, chemist, have invented a new and useful improvement in the treatment of the roe or eggs of fishes or reptiles, whereby the same are made to yield a large percentage of a substance which may be used, in many cases, as a substitute for the albumen of blood or of fowls' eggs.

To enable others skilled in the art to make and use my invention, I here give a description of the process.

The roe may be used fresh, or after being preserved by the use of salt or other antiseptic. I first wash with water the sacks containing the eggs, in order to remove blood, salt, and other impurities. I then slit the sacks and scrape out the eggs into three or four times their weight of water, to which is added from two to five per cent. of double aqua-ammonia. The eggs are digested in this liquid for twenty-four hours or more, and the solution so obtained is strained through a cloth. In some cases I simply evaporate the strained solution at a heat not exceeding 150° Fahrenheit, and thus obtain the substance sufficiently pure for some uses; but to produce a purer article I add to the strained solution muriatic, sulphuric, or other acid in sufficient quantity to neutralize the ammonia and thereby precipitate the dissolved organic matter in the form of curd or flocks. The precipitate is washed with water to remove all saline matter, and then collected on a filter. When sufficiently drained it is put in a press and subjected to a gradually-increased pressure till it becomes a firm cake, retaining very little water. The cake may then be carefully dried by itself; but in order to prevent any injurious oxidation in drying I find it best to moisten the cake with enough aqua-ammonia to bring it into a gelatinous condition, so that during the subsequent drying the action of the air will be confined to the surface.

I do not limit myself to the use of ammonia, which acts merely by virtue of its alkaline character, but I employ also very weak solutions of caustic potash or soda, or of the carbonates of potash and soda, or of salts that have an alkaline reaction. The essential point is to have an alkaline liquid as a solvent, because neither water nor acids will dissolve the desired substance out of the eggs. Nor do I limit myself to any particular percentage of alkali, but I use just as little of the alkaline substance as I find by special experiment to be sufficient for effecting the solution.

When the product is to be used for food, it is simply ground and is then ready for use as an ingredient in various culinary compounds. When it is to be used for attaching pigment colors to cloth or paper, it is dissolved in water with the help of a little ammonia. When this solution is mixed with the pigment and printed on a fabric, the ammonia flies off in drying, leaving the substance insoluble in water. By steaming printed cloth the new fixing material is coagulated, and thus forms a binding agent as efficient as albumen.

Having thus fully set forth the nature and merits of my invention, what I claim as new, and desire to secure by Letters Patent, is—

1. The process of treating roe or eggs of fishes for obtaining a substitute for albumen, consisting, first, in dissolving the roe by means of ammonia, then precipitating by treatment with an acid.

2. The process of treating roe or eggs of fishes for obtaining a substitute for albumen, which consists in digesting the roe in a solution of ammonia or its specified equivalent, then precipitating by the acids named, and washing, pressing, and drying.

In testimony that I claim the foregoing I have hereto set my hand this 22d day of May, A. D. 1884.

JOHN M. ORDWAY.

Witnesses:
ROBERT H. RICHARDS,
DAVID S. LYLE.